United States Patent Office.

FRANÇOIS COIGNET, OF PARIS, FRANCE, ASSIGNOR TO "LA SOCIÉTÉ CENTRALE DES BÉTONS SYSTÉME COIGNET," OF FRANCE.

Letters Patent No. 99,637, dated February 8, 1870.

IMPROVEMENT IN TREATING ARGILLACEOUS LIMESTONES, TO OBTAIN HYDRAULIC CEMENT, &c.

The Schedule referred to in these Letters Patent and making part of the same.

*To whom it may concern:*

Be it known that I, FRANÇOIS COIGNET, of Paris, in the Empire of France, have invented a new and improved Method of Treating Argillaceous Limestones, for Obtaining Hydraulic Slacked Lime and Portland Cement; and I hereby declare the following to be a full, clear, and exact description of the same.

The hydraulic lime, the manufacture of which is described in this specification, has no connection with the material which bears this name in Austria, which is obtained by burning limestone, charged with clay in a sufficiently large quantity to prevent its slaking when sprinkled with water, and which is reduced to powder, by mechanical means, on coming out of the kiln. The present method is applicable only to hydraulic lime obtained from limestone containing less than twenty-one to twenty-two per cent. of clay, which is slaked, upon coming out of the kiln, by sprinkling with water.

In the ordinary process, the baked lime is sprinkled with water upon coming from the kiln. It is placed in piles; then it becomes heated, swells, decrepitates, and falls into an impalpable powder.

Some days after the sprinkling and the placing in piles, this lime is sifted, and that which passes through the meshes of the sieve is the hydraulic lime called flour of lime. But when limestone rich in clay is employed, there is always a considerable residuum of small pieces, which do not pass through the meshes; and this residuum, if it is abundant, is an important loss to the manufacturer.

Certain manufacturers have endeavored to make use of this residuum, by pulverizing it, and reincorporating it, when dry, with the lime itself; but the lime which contains this pulverized residuum, reincorporated when dry, is liable to slake slowly, in course of time, in mortars and "*bétons*," or concretes, which injures the solidity of the masonry in which it has been used.

In order to avert this danger, instead of reincorporating the residuum when dry and crushed, or ground, mixing it with the lime upon its entrance upon the sieve, I have conceived the idea of mixing the crushed residuum with the limestone upon its coming out of the kiln, and at the moment the water is thrown on, so that this powdered residuum will be exposed to the contact of the heat, and of the steam which becomes disengaged by the slaking; and, by reason of this contact with the steam at a high temperature, all parts of the powdered residuum, which would have slaked in course of time without this proceeding, are suddenly slaked, and the lime in which this residuum happens to be does not work or slake in course of time in mortar or "*béton*," whatever may be the quantity of the residuum which is reincorporated. On the contrary, so far from being injurious, the presence of this residuum augments the intensity of the adhesive power of the lime; and this intensity of adhesion is greater, according to the greater quantity of the residuum.

This manner of treating the pulverized residuum is one of the points of the invention which I claim; but I have deduced from it very important means for the manufacture of heavy, slow-acting cement, called Portland cement.

Cements generally are combinations, by igneous means, of a certain quantity of clay with the oxide of calcium, so as to form double silicates of lime and alumina.

Experience has demonstrated that the greater or lesser quantity of clay, according to a given amount of calcium or lime, plays a preponderant part, not only in the results obtained, but in the means to be employed, in order to obtain the maximum intensity of adhesion, and of the preservation of this adhesive quality, and, moreover, to avoid the great danger of the cracking of the cement—that is to say, of the working, the slaking, which very frequently is produced, and which compromises the condition of the masonry. In fact, if the calcareous mixture of clay and carbonate of lime does not contain twenty per cent. of the clay, the lime being in excess, it is useless to submit the limestone to a temperature, no matter how excessive; for either the semi-fusion characteristic of the cement is not produced, or else, if it appears to be produced when this cement is reduced to powder, the excess of lime slakes in time in the mortar, which falls spontaneously in powder. If, on the contrary, the limestone contains more than twenty-two or twenty-three per cent. of clay, the limestone becomes fusible, even at a moderate temperature. It becomes a kind of glass, which has the property of dissolving when dry—that is to say, of becoming disintegrated, and falling in dust, upon contact with the air, through simply cooling.

If the temperature is lowered, to avoid vitrification, the cement obtained from limestone containing more than twenty-two per cent. of clay is without strength, and becomes softened in time, on contact with dampness, while the limestone containing twenty to twenty-two per cent. of clay still remains in the state of chalk.

It is true, that if the limestone contains as much as from twenty-seven to thirty per cent. of clay, its calcination is effected at a temperature very little elevated; but there is then obtained a light, quickly-acting cement, of which the "*Cément de Vassy*" can be considered as the type. It is to a cement of this kind that in Austria is given the name of hydraulic lime.

The methods for which I ask Letters Patent only apply to slow-acting, or Portland cements.

I have just said experience has shown that heavy, slow-acting cement can only be obtained by acting upon limestone that does not contain more than twenty-two, nor less than twenty per cent. of clay.

Argillaceous limestone is universally distributed over the earth, being met with in Europe through all the first ascents of the Jura mountains, and is known under the name of Portland limestone. It is to be found, also, upon the first ascents of the Alps, in Austria, as well as in France.

The Jurassic limestone is composed of superincumbent layers, as numerous as they are varied in the proportion of clay which they contain, and in their thickness.

These beds or layers are found by hundreds, and are alternated in such manner, that while some layers are found that do not contain more than from ten to fifteen per cent. of clay, others contiguous contain twenty, twenty-five, thirty per cent., or more.

These layers are, in general, of little thickness, and there are very few of them that contain the wished-for portion of twenty to twenty-two per cent. of clay.

Homogeneous layers are sometimes met with; but more frequently only irregular layers are found, which, while thin, and mixed up, are not of homogeneous composition. They are composed of an infinity of beds or leaves, of which the composition is as irregular as that of the layers themselves; that is to say, layers which give an average of twenty to twenty-two per cent. of clay, will be found to be composed of a series of leaves, of which some contain less than twenty per cent. of clay, others more, although the mean may be from twenty to twenty-two per cent.; so that, if we submit to a high temperature, limestone in appearance homogeneous, it is almost impossible to prevent certain of the leaves of the limestone containing too much clay, from vitrifying and falling into powder when dry, while certain others, which do not contain enough clay—that is to say, less than twenty to twenty-two per cent.—give cements with an excess of lime, and which have the grave defect of slaking in time in mortars and cements, and causing them to crumble away.

This difficulty is so great that manufacturers have been induced, in order to obtain good Portland cement, to effect artificially the mixture of clay with the carbonate of lime, so as to obtain an argillaceous limestone, containing exactly twenty to twenty-two per cent. of clay.

The method most in use consists in dissolving, in water, limestone containing clay, so as to form a thin or liquid pulp, composed of argillaceous limestone, containing, on an average, the wished-for quantity of from twenty to twenty-two per cent. of clay. This pulpy mass is then allowed to drain; and, when it has hardened, it is cut in slices or blocks, which are dried, and carried to the kiln.

This artificial composition is submitted to a very high temperature, and the cement stone which results is then reduced to powder, and gives those renowned cements known under the generic name of "Portland cement."

This ingenious process has, however, great inconveniences, the gravest being that it is too expensive. However this may be, the cement is placed in kilns of great size, having great height, each of them containing as many as fifty metres, and more, of limestone.

These kilns are entirely filled, and the baking is effected altogether, and at a single operation. In working so large a mass, the heat must necessarily act unequally, so that, in practice, it is very seldom that a baking can be made without there being considerable parts overbaked, underbaked, and vitrified. Indeed, owing to the difficulties which attend this process, there is generally obtained, at great expense, a bad quality of Portland cement, which does not hold strongly, and cause the masonry to settle or soften in course of time.

As manager of the "*Societé des Bétons Agglomérés, (Système Coignet,)*" I have, in taking charge of the works at Seilly, given special attention to the manufacture of lime.

The quarry of Seilly is of Jurassic formation, (Portland limestone,) and is composed of more than a hundred layers, having very varied composition. Certain of these layers contain only ten to twelve per cent. of clay; certain others contain from twenty to thirty-three per cent., and even twenty-four to twenty-five per cent.

In the twenty-five metres of depth which compose the workable part of the quarry, there are about eight to ten metres of limestone, containing twenty to thirty-three per cent. of clay.

To select these layers, which often are not more than from ten to twenty-two per cent. centimetres thick, is almost impossible. There always remains among them parts not containing enough, or containing too much clay, so that, when, in accordance with the usual custom, I have attempted to bake at the required degree of heat for natural limestone having the necessary composition, and to crush after coming out of the kiln, I have invariably failed, the cements proceeding from the natural limestone always containing a notable proportion of limestone, with excess of lime, which slaked in time, ruining the masonry.

All my efforts to employ the natural limestone failed until the moment when I discovered, that by submitting the overburned and underburned residuum of the lime to slaking, by mixing it with the burned limestone on coming out of the kiln, at the moment of sprinkling and piling up, I prevented completely all further working in the masonry.

Under this process, the residuum of the lime, being submitted to the contact of steam at a high temperature, is penetrated through all the pores, and all that portion which is susceptible of slaking is slaked, and the lime thus prepared never gives rise to working in the masonry.

Having thus ascertained a method of preventing after-slaking of lime, I have applied the same to the manufacture of cement.

Knowing, as we do, that the proportion twenty to twenty-two per cent. of clay to eighty to seventy-eight per cent. of carbonate of lime is necessary; knowing, that with this proportion, a good cement can be obtained only upon the condition that we have a temperature sufficiently high to give to the limestone the characteristic and indispensable softening or semi-fusion, I have thought, that by submitting the totality of the layers of the workable portions of the quarry, taking every kind of argillaceous limestone containing from ten to twenty-four per cent. of clay, to the requisite temperature to obtain the necessary and characteristic softening or semi-fusion of the limestone containing twenty to twenty-two per cent. of clay, (to obtain Portland cement,) there would result two things:

First. The trifling quantity of the limestone containing too much clay would become vitrified, and would fall, when exposed to the air, into dust or powder, which would naturally separate better than could be effected by the ordinary mechanical means.

Second. The limestone not containing enough clay—that is to say, less than twenty-two per cent.—being too refractory to undergo softening, would remain in the state of burned lime, easy to distinguish, and to separate from the rest.

In a word, in submitting to the temperature necessary to obtain Portland cement from the whole of the limestone coming from the quarry, it is possible to eliminate that portion of limestone containing too much clay by vitrification and crumbling when dry, and the burned, but not softened lime by the ordinary process of reduction.

I introduce, then, into the ordinary lime-kilns, the whole of the argillaceous limestone of the quarry, without making any choice.

I put in fuel enough to produce the degree of temperature necessary to accomplish the softening of limestone containing twenty to twenty-two per cent. of clay.

I effect the baking by a continued fire, as for ordinary limes.

Each day, I draw off from the bottom a portion of the limestone.

The limestone, already chilled, carries with it a certain quantity of dust, proceeding from limestone too much charged with clay, and which, having been vitrified, crumbles when dry. The remainder is a mixture of ordinary burned lime and of limestone appearing overburned, and of a notable quantity of black stones, containing twenty to twenty-two per cent. of clay, and having undergone the softening of Portland cement.

I sprinkle upon this mixture of overbaked limestone, through a watering-spout, a quantity of water sufficient to produce the slaking of the lime.

I place in piles this overbaked lime thus sprinkled, and then, in the lime, there is developed a great heat, which gives rise to a scalding steam, so that the whole of the overbaked lime is bathed in an atmosphere of steam of a very high temperature, which penetrates through all the pores with an action so energetic that all slakable parts are slaked, and pass into the state of floured lime, while the limestone containing from twenty to twenty-two per cent. of clay, having been submitted to the characteristic softening of Portland cement, resists this slaking.

That part which resists slaking through the sprinkling by water is Portland cement of the first quality. It suffices, then, to effect the sifting of slaked piles, to obtain on the one hand a flour of slaked lime, containing the dust of the vitrified limestone, while on the other side is collected the Portland cement, divided into small pieces by means of the contact with the disengaged steam rising from the slaking.

Once having obtained, by sifting, the separation from the cement of the flour of lime, containing the dust resulting from the crumbling of the vitrified lime, it is only necessary to grind that portion not having passed through the meshes of the sieve, in order to obtain an excellent slow-acting Portland cement, weighing from one thousand two hundred and fifty to one thousand three hundred kilogrammes.

This method of baking at a high temperature the whole of the limestone is found to be so efficacious, that all the limestone containing twenty to twenty-two per cent. of clay is obtained in the form of Portland cement.

Analysis has indicated the quarry of Seilly contains thirty-three per cent. of limestone containing twenty to twenty-two per cent. of clay, and from this stone I obtain, by my process, thirty-three per cent. of Portland cement. Nevertheless, there exists more than thirty-three per cent. of residuum not passing through the meshes of the sieve.

Certain portions of limestone either containing eighteen, nineteen, and even twenty per cent. of clay, or not having been brought to the necessary softening through some cause or other—an irregularity in the fire, for instance—these portions of limestone, although slaked, and, therefore, not liable to slake in time in mortar, do not fall into powder or flour of lime, but remain in fragments, which, while having little consistency, nevertheless require a certain grinding and pressure in order to be reduced to powder.

This crushing of the fragments is effected by causing the residuum of the sifting to pass between a pair of grindstones, which need not be set very closely together.

The rotation of the grindstones disintegrates the burned lime, without crushing the cement, and I thus obtain "grits" (coarse meal) of cement.

On coming out of the mill, the product is passed through the sieve, and a kind of light cement, or dull, heavy lime, is obtained, which passes through the meshes of the sieve in the proportion of one-fourth to one-fifth of the whole. That which does not pass through is pure Portland cement.

The flour obtained from this first machine, resulting from sifting through a wire gauze of fifty threads to the inch, weighs about one hundred kilogrammes to the cubic metre, and I give it the name of light, slow-acting cement. Reduced to a paste with water, it commences taking hold in less than thirty minutes. The resistance to the "$aiguille\ vicat$" is complete in less than six hours.

The complete taking hold is accomplished in less than twelve hours, while the heavy Portland cement takes a decided hold in less than fifteen minutes, and the complete hold is accomplished in less than four hours.

This method of treatment by baking the whole of the limestone furnished by the quarry, far from injuring it, or causing it to deteriorate, imparts to it superior qualities. Its weight increases in large proportion. It resists, in an absolute manner, the "$aiguille\ vicat$" in less than twelve hours, and it does not work; whence it results, that by this simple and economical mode of treatment, three products of superior quality are obtained:

First. Sixty per cent. of excellent flour of lime, which, in twelve hours, will resist the "$aiguille\ vicat$."

Second. Ten per cent. of a light, slow-acting cement, which will resist the needle in eight hours.

Third. Thirty per cent. of heavy, slow-acting Portland cement, completing its action in less than four hours.

These last two cements take hold less quickly than artificial Portland cement, but their hardness, constantly and regularly increasing, attains and soon goes beyond that of the most renowned artificial cements. Besides, there is no sign of any ulterior slaking taking place in course of time.

Having now described my invention, and the manner in which the same is or may be carried into effect,

What I claim, and desire to secure by Letters Patent, is—

1. The utilization of the residuum arising in the manufacture of lime, by mixing the pulverized residuum with the calcined limestone at the time the latter is being sprinkled, substantially as herein set forth.

2. The process, herein described, of obtaining from argillaceous limestone, at a single burning, three distinct products, viz: first, flour of lime; second, light, slow-acting cement; third, heavy, slow-acting Portland cement.

3. In the manufacture of lime, the method of burning Portland limestone, so called, at the temperature required to bake Portland cement, substantially as set forth, whereby that portion of the stone producing bad cements may be eliminated by vitrification and reduction, when dry, so as to leave an hydraulic lime.

4. Eliminating from the calcined limestone all of the lime not containing enough clay, and preserving the excess of lime, by means of slaking effected by submitting the whole of the limestone which has been burnt at the temperature specified to a sprinkling of water on coming out from the kiln, the limestone being in such condition that the heat of the steam produced will cause the complete slaking of all such portions as are capable of being slaked.

5. Separating or reducing, by means of grinding, as herein described, the fragments or pieces of lime charged with clay, which, although slaked, still have a certain cohesion, the product arising from the grinding-operation being a light, slow-acting cement, substantially as set forsh.

In testimony whereof, I have signed my name to this specification, before two subscribing witnesses.

FRANCOIS COIGNET.

Witnesses:
 F. OLCOTT,
 ARMANT.